(12) United States Patent
Bogdan et al.

(10) Patent No.: US 11,752,563 B2
(45) Date of Patent: Sep. 12, 2023

(54) DENTAL MILLING MACHINE

(71) Applicant: Ivoclar Vivadent AG, Schaan (LI)

(72) Inventors: Vadim Bogdan, Pforzheim (DE); Senad Lidan, Sargans (CH); Gottfried Rohner, Altstätten (CH)

(73) Assignee: Ivoclar Vivadent AG, Schaan (LI)

(*) Notice: Subject to any disclaimer, the term of this patent is extended or adjusted under 35 U.S.C. 154(b) by 881 days.

(21) Appl. No.: 16/328,395

(22) PCT Filed: Aug. 30, 2017

(86) PCT No.: PCT/EP2017/071757
§ 371 (c)(1),
(2) Date: Feb. 26, 2019

(87) PCT Pub. No.: WO2018/046366
PCT Pub. Date: Mar. 15, 2018

(65) Prior Publication Data
US 2021/0170503 A1    Jun. 10, 2021

(30) Foreign Application Priority Data

Sep. 6, 2016 (EP) .................................. 16187371
Mar. 17, 2017 (EP) .................................. 17161558

(51) Int. Cl.
*B23C 3/16* (2006.01)
*A61C 13/00* (2006.01)
*G05B 19/18* (2006.01)

(52) U.S. Cl.
CPC ............ *B23C 3/16* (2013.01); *A61C 13/0004* (2013.01); *G05B 19/188* (2013.01); *G05B 2219/45145* (2013.01)

(58) Field of Classification Search
CPC ..... B23C 3/16; A61C 13/0004; G05B 19/188; G05B 2219/45145
See application file for complete search history.

(56) References Cited

U.S. PATENT DOCUMENTS 5,951,219 A * 9/1999 Stadtfeld ............... B23F 17/003
409/137
9,481,066 B2   11/2016 Tüllmann
(Continued)

FOREIGN PATENT DOCUMENTS

CN         203804798 U    9/2014
CN         104096696 A   10/2014
(Continued)

*Primary Examiner* — Thomas C Lee
*Assistant Examiner* — Ameir Myers
(74) *Attorney, Agent, or Firm* — Ann M. Knab; Thad McMurray (57) ABSTRACT

The invention relates to a dental milling machine which has a closed milling chamber (12). Said milling chamber has an air inlet opening and an outlet which are substantially opposite each other relative to the milling chamber and generate an air stream. Said air stream sweeps over a machining area in which a milling tool subjects the workpiece to a milling machining step. One end of the milling chamber (12), in particular the front end, has a door that can be opened. The base (42) of the milling space (12) runs at least partially at an angle and in particular is rounded off and the outlet (40) is connected to the lowest region of the base (42).

19 Claims, 7 Drawing Sheets

(56) References Cited

U.S. PATENT DOCUMENTS

| | | | |
|---|---|---|---|
| 2003/0027509 A1* | 2/2003 | Gegenheimer | B24B 31/14 |
| | | | 451/66 |
| 2007/0131599 A1* | 6/2007 | Goettl | E04H 4/169 |
| | | | 210/167.18 |
| 2011/0008113 A1* | 1/2011 | Abe | B23C 5/109 |
| | | | 407/42 |
| 2011/0083307 A1 | 4/2011 | Shih | |
| 2013/0244846 A1* | 9/2013 | Koch | A61C 13/0003 |
| | | | 269/16 |
| 2017/0225283 A1 | 8/2017 | Bodgan et al. | |

FOREIGN PATENT DOCUMENTS

| | | |
|---|---|---|
| CN | 105458821 A | 4/2016 |
| CN | 205492417 U | 8/2016 |

\* cited by examiner

DENTAL MILLING MACHINE

CROSS-REFERENCE TO RELATED APPLICATIONS

This application is a National Stage application of International patent application PCT/EP2017/071757 filed on Aug. 30, 2017, which claims priority to EP patent application No. 17 161 558.6 filed on Mar. 17, 2017, and which also claims priority to European patent application No. 16 187 371.6 filed on Sep. 6, 2016, all the disclosures of which are incorporated herein by reference in their entirety.

FIELD OF THE INVENTION

The invention concerns a dental milling machine.

BACKGROUND OF THE INVENTION

It has been known for a long time to provide dental milling machines, which are also meant to include here other dental processing machines for the machining of workpieces, with means for removing chips produced from the machining area. It has turned out to be comparatively efficient to produce, for this purpose, an aspirational air stream which passes through the machining area and sucks out air together with the chips caught from the milling area. Typically, fresh air—or even circulating air—is introduced into the milling chamber above the machining area for this purpose, and an aspirator connection is provided underneath the machining area.

Since with this solution, the cleaning effect is often not satisfactory, there have been numerous attempts of improving the removal of chips. For instance, it has become known from DE 40 27 107 A1 to make the milling chamber and therefore—from an aerodynamic point of view—the aspiration area smaller. However, this results in the path of movement which is available for the workpiece and tool being restricted. Although this problem may at least be minimized by a skilful selection of the arrangement of axes, the provision of particularly designed movement arms for restricted physical conditions is rather complex, and sometimes the milling precision will suffer then as well.

It has also been suggested to provide the machining area with blowing nozzles in order to blow up the chips produced there and prevent them from depositing there. Typically, however, the place of actual machining is permanently changing during the milling process, such that a multitude of blowing nozzle must be provided. The blowing nozzles which are not pointing towards the respective current working place are virtually blowing blankly, so that such a solution has always been inefficient.

Also as far as the blowing nozzles are concerned, numerous improvements have been suggested. For example, it has become known from EP 3 012 065 A1 to provide the nozzles with electrodes which provide an electrical field for deionizing the chips. This solution is particularly advantageous when dental plastic materials are used since these no longer tend to adhesively deposit at the surfaces of the milling chamber due to electrostatic forces then.

With other dental materials, such as ceramics, the tendency of milling dust to become electrostatically charged is lower anyway.

Further, different attempts have become known for fluidically optimising the removal of milling dust or of milling chips, respectively. As an example for this, reference should be made to DE 20 2015 100 312 U1. With this solution, a uniform air stream should be produced which should also capture the exposed shanks of tools of a tool magazine.

It has further already been suggested as well to arrange air inlet nozzles at two upper corners of the room, which are spaced apart from each other, and provide a central aspirator opening underneath the machining area.

Herein, it is, however, disadvantageous that when the finished workpiece is taken out, it may fall directly into the aspirator connection if handled carelessly, such that the dental work will then be lost. In addition, the dental technician will have a feeling of insecurity during the operation, due to this "toilet bowl effect", because he fears that the restorational result will get lost, which considerably restricts the acceptance of such a solution.

SUMMARY OF THE INVENTION

In contrast to this, the invention is based on the task of creating a dental milling machine which has a better acceptance, but yet allows a clean work without any disturbance.

This task is solved, in accordance with the invention, by the attached claims. Advantageous further embodiments result from the subordinate claims.

In accordance with the invention, a dental milling machine should be have a milling chamber closed in itself and particularly designed. Typically, the milling chambers of milling machines are made out of sheets which are screwed to each other or attached in a different fashion, wherein other materials are partially employed as well. In contrast to this, a single-piece design made out of a suitable material, such as a plastic material, is preferred in accordance with the invention and is used in accordance with the invention. The milling chamber will then preferably not have any interior corners, at least not in the lower region, such that no chips and no milling dust can deposit there.

The transitional areas between the base and the side walls are each rounded off with radii which amount to several millimetres at least, but preferably several centimetres in the relevant positions, for example 10 cm.

The base of the milling chamber is then preferably shaped in the fashion of a hollow fillet which extends at a radius of, for instance, also 10 cm underneath the machining area and across the milling chamber. The inclination of the base is, in addition, preferably at an angle, which is, in such a fashion that the lowest position of the base joins at the aspirator connection. Compared with this, the base underneath the machining area is distinctly higher, such that milling dust or milling chips produced there can already easily be supplied to the aspirator connection with the help of gravity.

In particular, however, the inclination of the base supports the current from the air inlet connection towards the aspirator connection across the base, all the more because no obstacles, such as undercuts, are formed in the course of the base.

In an advantageous embodiment, the air inlet connection is diametrically opposite of the aspirator connection, which is, at an upper corner of the milling chamber. At least one nozzle, preferably a number of nozzles, are directed towards the machining area, such that said is blown over.

In another advantageous embodiment, a base washing nozzle is put into practice. This blows air vertically downwards, such that the air stream of said nozzle will slide along the adjacent side wall and then be led over the expressly large deflection radius into the hollow fillet, and will there blow possible depositions towards the aspirator connection as a laminar current.

It is particularly favourable if the inclination of the base, starting from the deflection radius underneath the air inlet is essentially constant and at least is not getting smaller. As a result, the tendency of forming depositions there will be clearly reduced compared with the state of the art.

In a modified embodiment, the inclination of the base towards the aspirator connection should even increase slightly, for example from 18 to 23 degrees. Herewith, it is possible to take into account the current velocity's reduction over the course of the base due to the air inlet nozzle, since the overall flow area becomes larger, such that the tendency of the chips to adhere increases in the direction towards the aspirator connection as a result of the lower current velocity, which phenomenon, however, is compensated for by the larger inclinational angle of the base.

Whereas it is preferred to put into practice the milling chamber in accordance with the invention as a single-piece moulding, this does not mean that no door opening might be provided for the milling chamber. The door is preferably distinctly spaced apart from the base, such that the important removal of chips is not blocked by the door.

This holds true analogously to the same extent for openings which are necessary for the operation of the milling chamber otherwise, for instance, the drive spindle, operational arms, such as a robot arm for the workpiece, or also openings for changing the workpiece or for a tool change.

Preferably, the machining area—relative to the centre of the milling chamber—is neighbouring the air inlet more closely than the aspirator connection. As a result, a comparatively strong air current may be provided at a comparatively small flow area, which makes possible a good blowing-out performance for the machining area.

In accordance with the invention, it is particularly favourable that the base may be shaped basically in the fashion of a hollow fillet. Viewed in a side cut, the milling chamber therefore has essentially the shape of a "U" in its lower region. As a result, dust particles or chips are supplied to the middle centre of the hollow fillet, where they may stack up and insofar form some resistance to the current, which promotes their removal.

It is to be understood that the precise shape of the cross section of the hollow fillet is adaptable to the requirements to a great extent. So, for instance, the cross section may be selected to be slightly more pointed, i.e. slightly more "V"-shaped, wherein, however, attention must be paid to it that the current velocity is not reduced owing to too small a radius.

In accordance with the invention, it is particularly favourable as well that underneath the machining area, a uniform and closed area in the shape of the base is present. Even if the machining area moves, which is the case regularly in case of a four-axes milling machine or a five-axes milling machine, the machining area is always blown over within the area in front of the nozzles of the air inlet, and always above the closed and smooth base. A restorational part which may fall down by accident would remain lying on it and could be used by the operator without any problems.

The dental milling machine in accordance with the invention is suitable both for wet operation and for dry operation. For wet operations, the deionizing electrodes may be switched off, and in an advantageous embodiment of the invention, it should be possible to switch between a wet outlet and an aspirator lead destined for dry operation with the help of a switching hatch. The switching hatch may preferably have a joint at the upper side of the connection. In the closed state, the air will then be lead off in an upward direction, and, if necessary, depositions remaining at the hatch in the lower region may be washed off when switching to wet operation and thus opening the outlet.

In an advantageous embodiment, the switching hatch, which may also be shaped in the form of a slider, should alternatively either cover the air nozzles and release the deionizing electrodes, as is favourable for milling PMMA or other plastic materials, or cover the deionizing electrodes and release the air inlets, as is desired for milling ceramic materials or for wet milling.

It is also possible to use two separate locking elements instead of one switching element, which locking elements may be employed depending on the case of use. Locking the deionizing nozzles, for instance during wet milling, has the advantage that they will then not be polluted by milling dust.

Insofar, the hatch insulates against a lower, planar sliding surface which is formed without any undercuts and provides a smooth transition between the region of the outlet in front of the switching hatch and the region of the outlet behind the switching hatch when the hatch is open.

The plastic part used for the production of the milling chamber may be created in any suitable fashion, wherein a smooth interior surface is essential. For example, it may be produced by means of centrifugal casting.

In accordance with the invention, it is particularly favourable if the outlet extends laterally away in extension of the hollow-fillet base. In particular in the case of wet working, this will lead to an unhindered flow of water which will carry away chips brought along without there being any mentionable re-direction of the current at the outlet of the milling chamber.

In an advantageous embodiment of the invention, the cleaning performance of the dental milling machine in accordance with the invention should be further improved with the help of a particular arrangement of the blowing-air nozzles and with the help of a particular control device.

For this purpose, the blowing-air nozzles should be switched on purposefully for few seconds at high air pressure and therefore a high velocity of the air with the help of a control device. Due to the pulse-like supply of air, a particularly good swirling and therefore the possibility of particularly good aspiration may be provided.

The air nozzles are preferably designed as air amplifying nozzles. With such nozzles, an annular channel is provided at the course of the nozzle. Said channel is then supplied with compressed air. Via a narrow drain nozzle, the air enters into the interior of the nozzle at high speed.

Due to a combination of Coanda effect and Venturi effect, the air will adhere to the curved interior wall of the nozzle near the annular gap, whereby the air stream is lead towards the nozzle outlet. In the central inlet area of the nozzle, a vacuum is created as a result, due to which a large volume of air is provided for passing through the nozzle. This results in a large air volume with such air amplifying nozzles, together with a high current velocity.

A nozzle in which the combination of Coanda effect and Venturi effect is made use of as well, however at a position lying at the outside, is already known from DE 25 37 953 A1.

Due to the channels of the air amplifying nozzles which are open at the inside, air may be aspired in a particularly favourable fashion in accordance with the invention with the help of the air aspirational air stream even when the compressed air is switched off,. For this purpose, it is preferred to operate the aspirational device at reduced power during a milling step, which is done continuously.

During the specific pulse-cleaning process after the milling step, the aspirational device is preferably switched on at full aspirational power, in accordance with the invention.

In an advantageous embodiment, the added-up flow areas of the air amplifying nozzles should correspond to the flow area of the outlet.

The pressures and flow velocities provided in accordance with the invention as well as air volumes are adaptable to the requirements to a great extent. If the inflational air pressure exceeds a given value, it is favourable to use a pressure reducing device which reduces the air pressure to, for example, 5 bar or 2 bar.

It is particularly favourable that the pulse-like blowing power provided in accordance with the invention reduces the necessary compressor power for the blowing-air stream. Typically, compressors are provided with a compressed-air depot of, for example, 50 litres. If the compressor, as is usual with economically priced compressors, has a continuous power of, or instance, 30 l/min, the compressed-air depot may be made use of in accordance with the invention. During the pulse-blowing, it is then possible to blow at a volume stream of 240 l/min, for example.

In accordance with the invention, it is favourable if the blowing pulse essentially corresponds to the interior space volume of the milling chamber as far as the air volume is concerned, such that during the blowing pulse, the entire milling chamber is provided with fresh air.

It is to be understood that the aspirational device must be able to absorb the occurring peak of compressed air without any problems. This, however, is typically unproblematic because such aspirational devices are typically provided with an aspirational air volume of, for instance, 500 l/min, i.e. distinctly more than is envisaged for the pulse blowing in accordance with the invention, as far as the volume stream is concerned.

In a particularly favourable fashion, after the blowing pulse, both the aspirational air stream and the blowing air stream are switched off. As a result of the fresh air supply through the air aplifying nozzles, there is an ambient air pressure inside the milling chamber, and, for example, a tool change may be made through a back door in the milling chamber for carrying out the next milling step, wherein no noteworthy exchange of air takes place with the surroundings.

It is particularly favourable, in accordance with the invention, that cleaning may be pre-set with the help of the pulse blowing in accordance with the invention, corresponding to the basic milling programme, and be carried out automatically. If, for instance, a milling step takes 10 min, the pulse blowing may be carried out for between 5 seconds and 15 seconds, with an aspirational air stream being at the same time increased, after the end of the milling step in a pre-set fashion. The necessity for an intervention by the user may be avoided in accordance with the invention. If, for example, a bridge made up of a plurality of individual components is to be milled, a number of milling steps may be made one after another without any problem, each with little interruption by the pulse blowing, and, if required, by a necessary tool change.

The dental milling machine in accordance with the invention is not restricted to one particular material. For instance, the process described as preferred herein may be employed for milling ceramics out of zirconium dioxide. When milling composite or plastic materials, respectively, the air amplifying nozzles should be used with deionizing electrodes in front of them, which, when not used, are protected by a cover. The deionizing electrodes are operated at an alternating voltage of between 5,000 volt and 10,000 volt and are designed for deionizing the plastic chips accumulating during the milling of plastics so that they cannot adhere to the tool or the wall of the milling chamber and can thus be carried away better.

During the milling of silicate or feldspar ceramics, such as lithium disilicate, for example, wet milling is possible as well. Here too, the air amplifying nozzles in accordance with the invention may be employed for cleaning.

If a change from wet to dry milling is to be made, a particularly good drying and cleaning is necessary; this can be carried out by means of pulse blowing interlaced several times, in according to the invention It is to be understood that in accordance with the invention, the milling or robot arm which holds the workpiece is cleaned as well. Its most probable position is in the area arranged to the right in the preferred embodiment of the dental milling machine, such that two nozzles are provided there. The milling arm is rotated in any suitable fashion in order to produce as little wake flow as possible on the one hand, and make sure, on the other hand, that all surfaces of the milling arm can be cleaned all around.

Preferably, the dental milling machine in accordance with the invention is designed as a 5/0 milling machine, i.e. with 5 axes of movement of the robot arm carrying the workpiece and no axis of movement of the milling spindle.

BRIEF DESCRIPTION OF THE DRAWING

Further advantages, details and features result from the subsequent description of several exemplary embodiments of the invention with the help of the drawings, which show.

DETAILED DESCRIPTION

Figure 1:
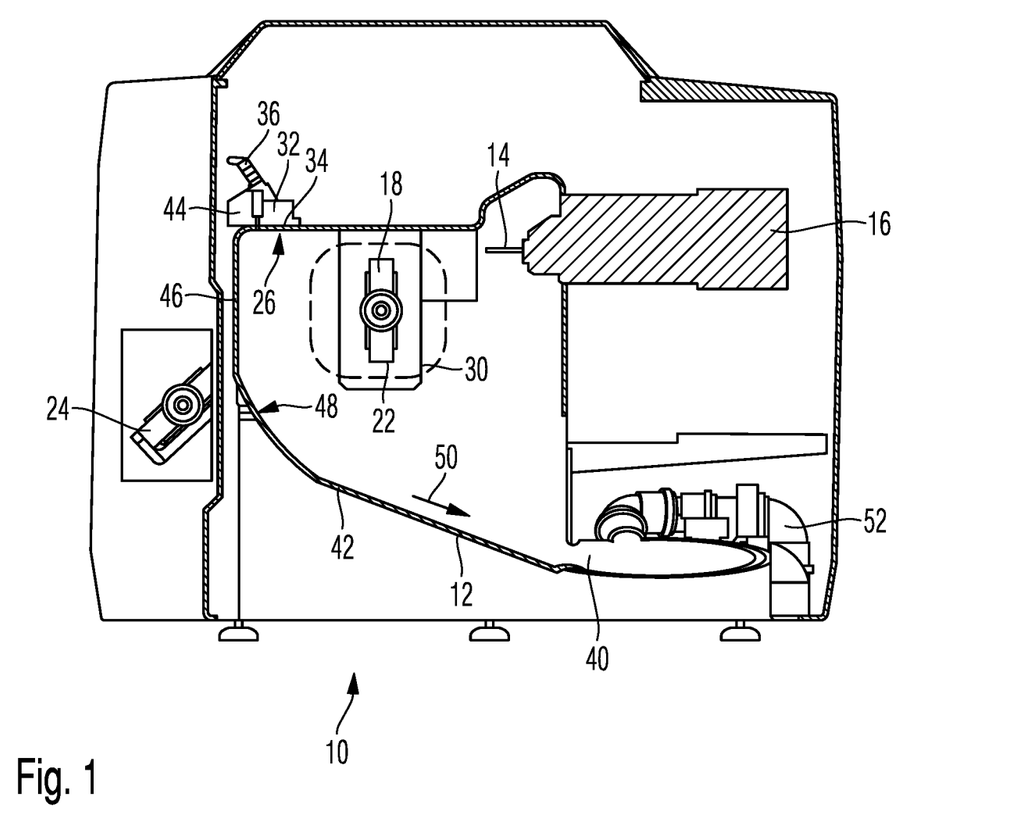
FIG. 1 a schematic view of one embodiment of a dental milling machine in accordance with the invention.

The dental milling machine 10 which is depicted in FIG. 1 has a milling chamber 12 which is designed in a particular fashion. Milling chamber 12 is a closed element and is made of some material with a smooth and non-adhesive surface, such as a plastic material, for example. In a basically known fashion, it accommodates a spindle 14 which serves as a tool and is driven by a spindle motor 16. Further, it accommodates workpiece 19 which is mounted in a workpiece holder 22. Via a number of movement axes, the relative position between workpiece 18 and spindle 14 may be modified, for example in five axes.

For the change of the workpiece, a rear wall of milling chamber 12 is provided with a door, and behind the milling chamber a magazine with further workpieces is arranged, out of which another workpiece 24 is visible in FIG. 1.

Further, the front wall of milling chamber 12 is provided with an access door in its upper region.

The left upper side, in the depiction according to FIG. 1, of milling chamber 12 accommodates an air inlet opening 26 which is provided with a number of nozzles each. The nozzles are mainly directed to a machining area 30 in which the spindle machines the workpiece. Nozzles 32 are attached to a nozzle carrier 34 which in turn is attached to milling chamber 12 from the outside.

Within the area of nozzle carrier 34, electrodes 36 are arranged in addition which are supplied with electric voltage for deionizing the air let in. The supply is done during dry operation, while the electrodes are closed by a sliding device, which is not depicted, during a wet operation of dental milling machine 10. Thus, either deionizing electrodes 36 or nozzles 32 may be covered by the sliding device.

Starting from the left upper corner, according to FIG. 1, the inlet air provided will flow to machining area 30 and beyond it to an outlet 40. Outlet 40 is positioned diametrically opposite of air inlet opening 26. Floating particles, such as milling dust, for example, are thus removed from the milling chamber and are carried away with the air stream.

In many cases, however, milling chips are created which fall down, into the area of the base 42 of the milling chamber, due to their weight. In accordance with the invention, the base 42 of the milling chamber should now be inclined, which is, in such a fashion that it will drop towards outlet 40, in particular at an essentially constant slope. The milling chips tend to slide in this direction due to their own weight.

In a particularly favourable embodiment, a directed carrier stream is additionally provided for the base, which stream is created by a nozzle 44. Nozzle 44 causes air to flow vertically downwards along side wall 46. At the bottom, adjacently to side wall 46, a stream re-directing device 48 is arranged, which has a very large radius of, for instance, half the diameter of the milling chamber. The stream from nozzle 44 will therefore be essentially laminar over the stream along side wall 46, further along stream re-directing device 48, and then across base 42. There, this carrier stream 50 will take away chips which are present there, and will supply them to outlet 40.

For this purpose, outlet 40 is preferably connected, via an aspiration line 52, with a source of vacuum which is not depicted. Therefore, a vacuum is created at outlet 40, which increases the flow velocity there.

As a result of the carrier stream 50 created, it is additionally possible to observe that some milling chip falling down will not even reach base 42, but rather be immediately carried away by carrier stream 50 and supplied to outlet 40.

Figure 2:
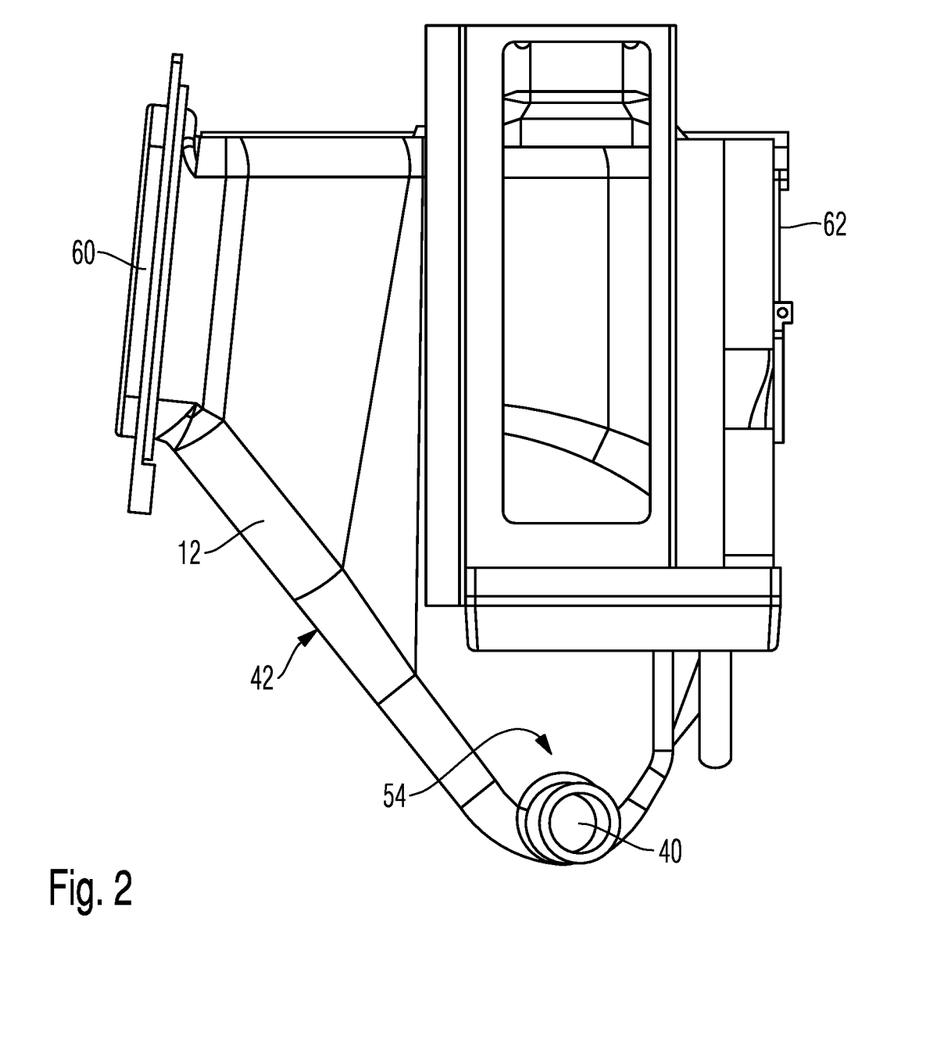
FIG. 2 a side view of the milling chamber of the machine according to FIG. 1.

It can be taken from FIG. 2 in what fashion milling chamber 12 may be formed in a lateral vertical view. Milling chamber 12 is formed, in the area of base 42, in the fashion of a hollow fillet and has an essentially "U"- or "V"-shaped appearance. In a similar fashion as, for instance, a rain gutter, milling dust which is flying around is supplied to the central area 54 of base 42 and may thus be supplied to outlet 40 together with carrier stream 50.

It can also be taken from FIG. 2 that a door 60 is formed in the upper/front region of the milling chamber, via which door the milling chamber may be opened.

A back door 62, which is also positioned rather far upwards, is closed during the milling operation and serves for the purpose of exchanging the workpiece.

Figure 3:
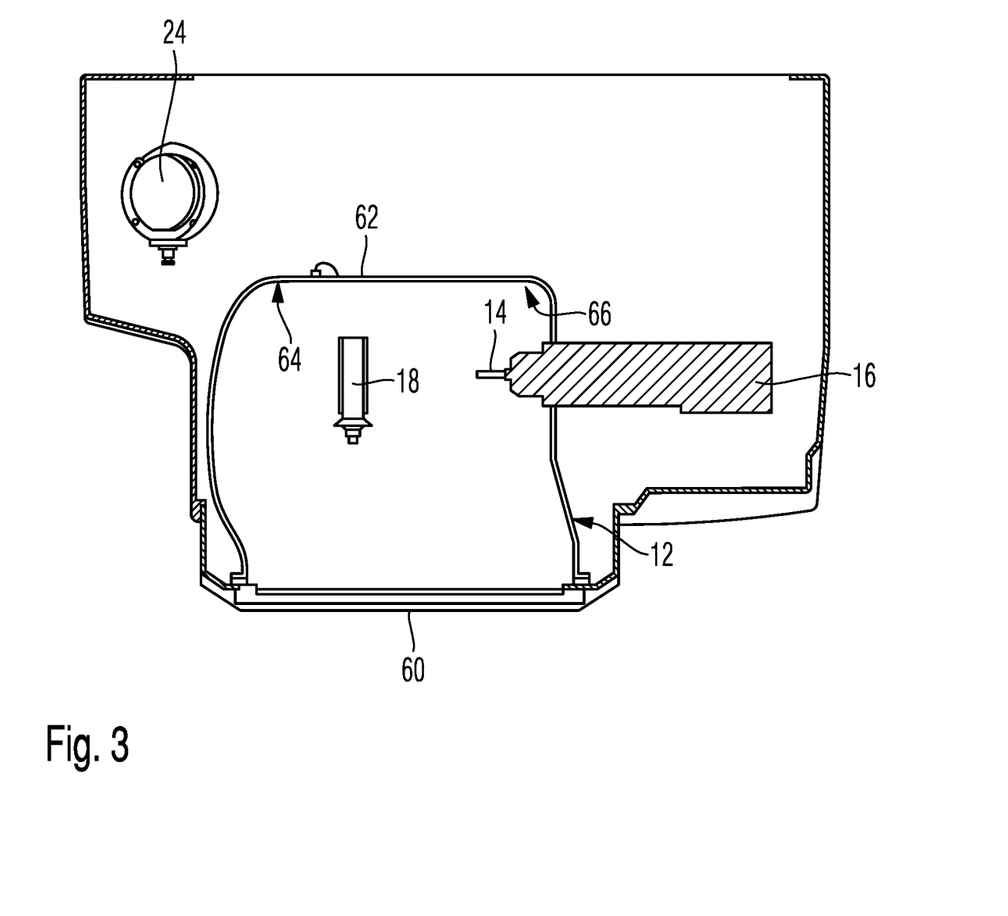
FIG. 3 a horizontal cut through the embodiment according to FIGS. 1 and 2.

From FIG. 3, a dental milling machine 10 in an embodiment in accordance with the invention is visible in a horizontal cut. Equal reference numbers indicate the same or corresponding parts here as well as in further Figures. As can be seen, milling chamber 12 has rounded corners 64 and 66, such that there is no danger of any milling chips depositing there.

Figure 4:
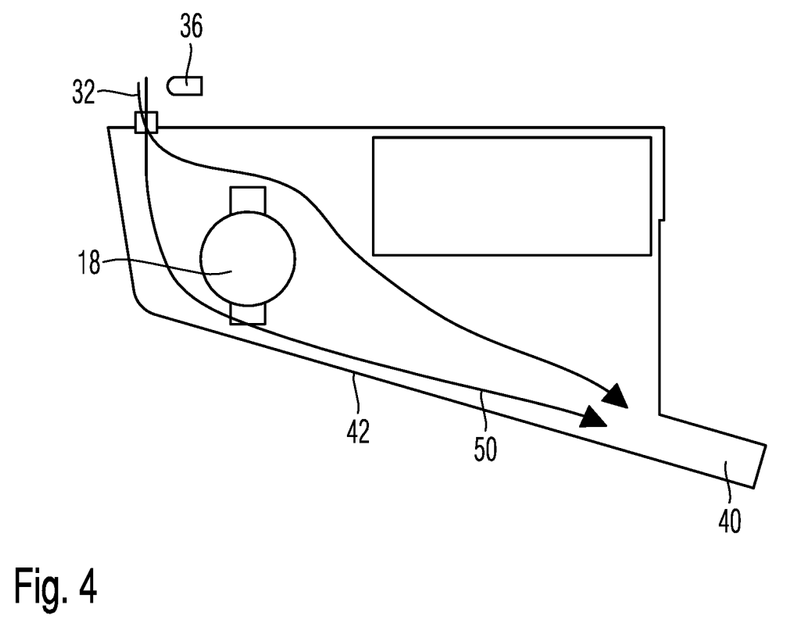
FIG. 4 a schematic view of one embodiment of a milling chamber in accordance with the invention of a dental milling machine.

Another embodiment of a dental milling machine in accordance with the invention is visible schematically from FIG. 4. The machining area, and together with it, workpiece 18, are positioned in the left third of milling chamber 12, i.e. closely neighbouring nozzles 32. In this position, the air stream has a comparatively high flow velocity, whereas this is typically reduced in the direction towards outlet 40 due to the larger flow area. Base 42 is provided with a continuous inclination in the embodiment according to FIG. 4 as well.

Figure 5:
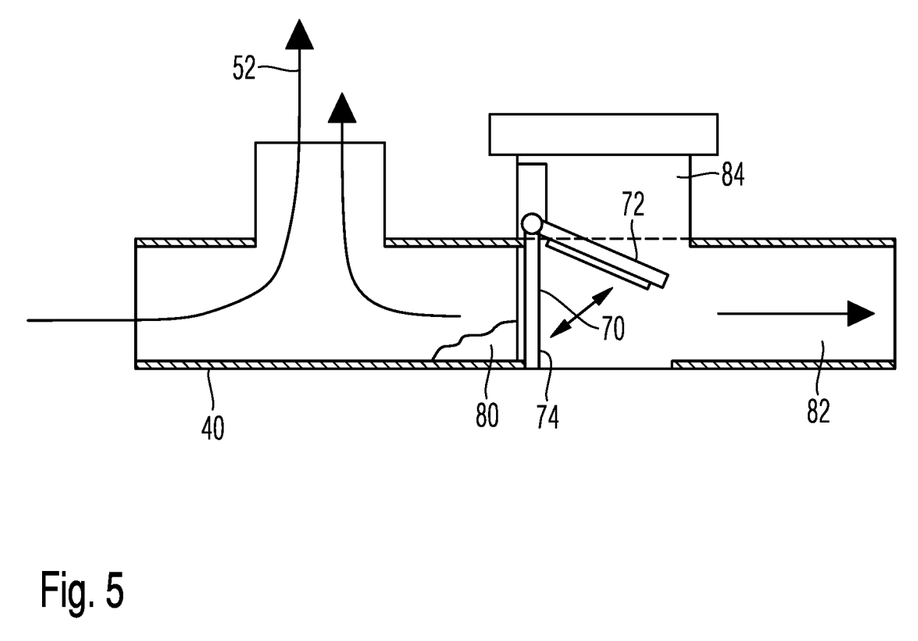
FIG. 5 a detailed view about one embodiment of a dental milling machine in accordance with the invention.

From FIG. 5, a switching device for wet and dry operation can be seen. A switching hatch 70 may be swivelled between the upper wet position 72 which is depicted in FIG. 5, and the lower dry position 74 extending vertically. The axis of switching hatch 70 is positioned upside at the corresponding lead.

In dry position 74, switching hatch 70 is closed. The air stream through outlet 40 is in the direction towards aspirational lead 52, which branches off switching hatch 70. At switching hatch 70, deposits 80 may form in this embodiment.

When switched to wet operation now, switching hatch 70 is swivelled to wet position 72. In this position, deposits 70 lie freely inside the washing water which passes through outlet 40, such that the water current will take deposits 70 with it and will supply them to waste water connection 82.

Above switching hatch 70, there is an additional maintenance duct 84 in the embodiment depicted here, which makes possible an occasional basic cleaning and maintenance in a basically known fashion.

Figure 6:
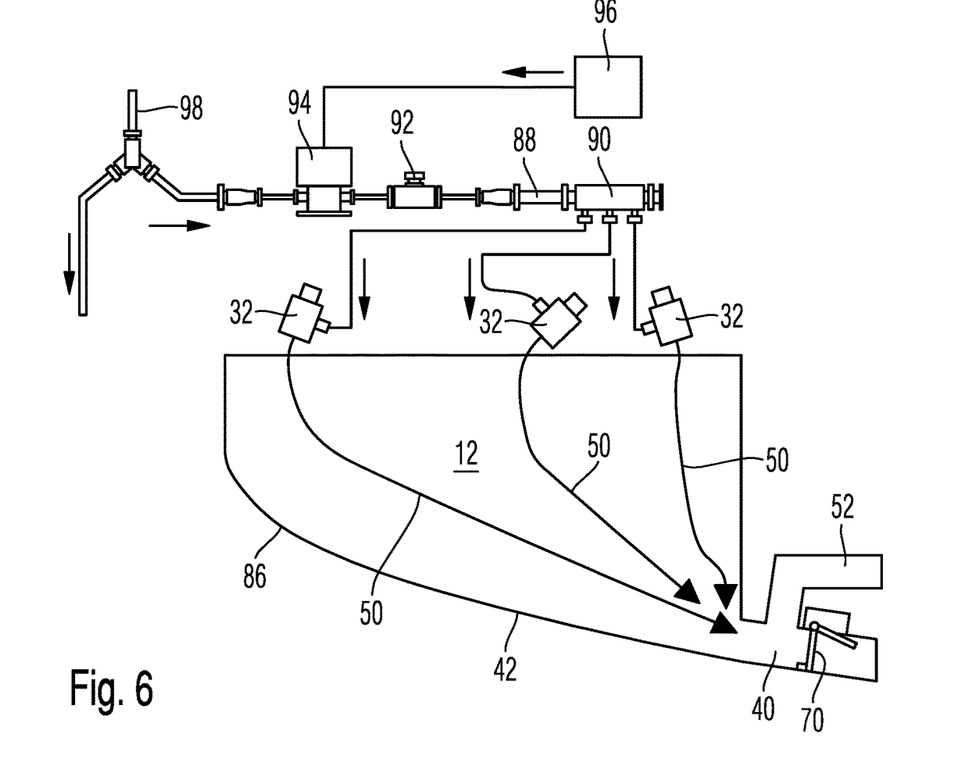
FIG. 6 a schematic depiction of another embodiment of the invention.

In FIG. 6, another embodiment of a dental milling machine in accordance with the invention is depicted. Equal reference numbers indicate the same or corresponding parts here as well as in the other Figures. The air nozzles 32 in accordance with the invention are formed as air amplifying nozzles, for which the design can be taken in detail from FIG. 6a.

Three air nozzles 32 are provided, which are each arranged in an inclined position. The air amplifying nozzle 32 which is arranged to the far left, and which is arranged farthest away from outlet 40, has an inclination of approximately 20 degrees to the left, i.e. towards the side wall adjacent to it. The air stream is thus carried out following in a particular good fashion the internal radius 86 of base 42.

The air amplifying nozzle 32 which is arranged to the far right is also facing its neighbouring side wall, also at an angle of 20 degrees as well. Deposits at the side walls may be prevented in this fashion.

Central air amplifying nozzle 32 is translocated in the direction towards outlet 40 and inclined into the direction pointing away from the outlet, i.e. it predominantly supplies the central region of milling chamber 12.

Figure 7:
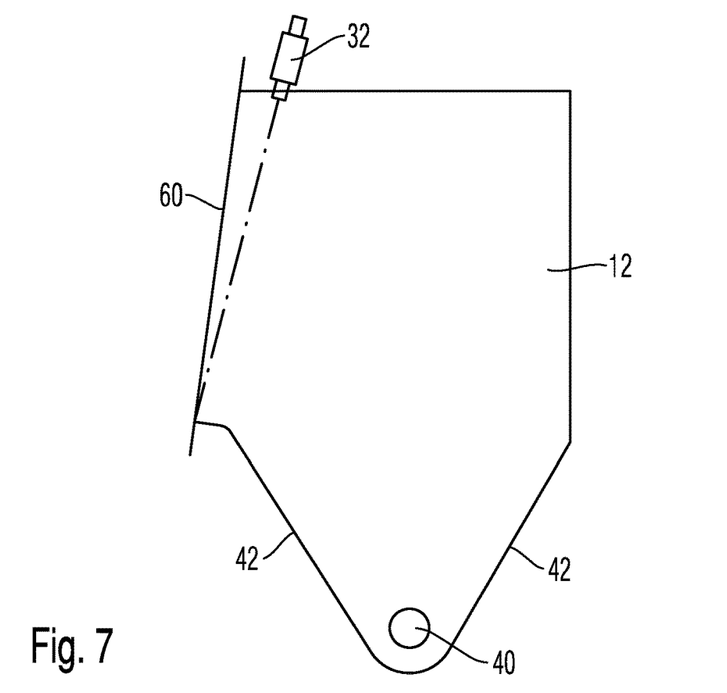
FIG. 7 a cut through the embodiment according to FIG. 6, however from a position rotated by 90 degrees.

Further, air amplifying nozzles 32 are translocated into the direction towards door 60, i.e. towards the front inside milling chamber 12, as can be taken from FIG. 7.

It is to be understood that the arrangement of air amplifying nozzles 32 may be adapted to the requirements to a great extent. They are fed together via a compressed air lead 88 with a distributor 90. Distributor 90 allows the relative adjustment of the current volumes towards the individual air amplifying nozzles 32.

In the exemplary embodiment depicted, a pressure reducer 92 is further provided, and a valve 94 switches the compressed air, based on the signal of a control device 96.

Valve 96 is connected to a compressed air network 98 on the input side, which network is under pressure, for instance 7 bar to 10 bar.

Figure 6A:
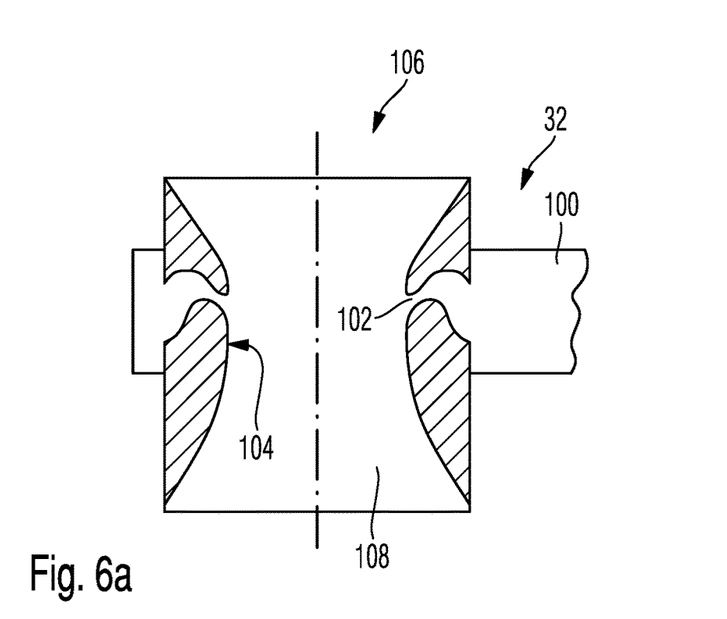
FIG. 6a a cut through an air amplifying nozzle to be preferably employed in accordance with the invention.

A possible embodiment of an air amplifying nozzle 32 can be taken from FIG. 6a. Via supply line 100 and an annular gap 102, air is introduced at a high current velocity due to the narrowing of the annular gap. The current leans to the curved edge 104 of the nozzle. In the central entrance area 106, a considerable negative pressure is created which causes the aspirational air to be sucked in at a high current velocity and be blown out through the nozzle, wherein at the same time a high volume of air is achieved.

If no inlet air is admitted inside through air inlet channel 100, the air amplifying nozzle 32 in accordance with the invention may act as an air inlet via its central opening 108, such that an equalization of pressure between the milling chamber and the ambient air may be carried out as a result.

In accordance with FIG. 7, air amplifying nozzles 32, or at least a part of them, should be inclined diagonally in the direction towards door 60, and in addition be arranged adjacently to it.

As a result, the door is blown free, such that the inside of the milling chamber is well visible.

Figure 8:
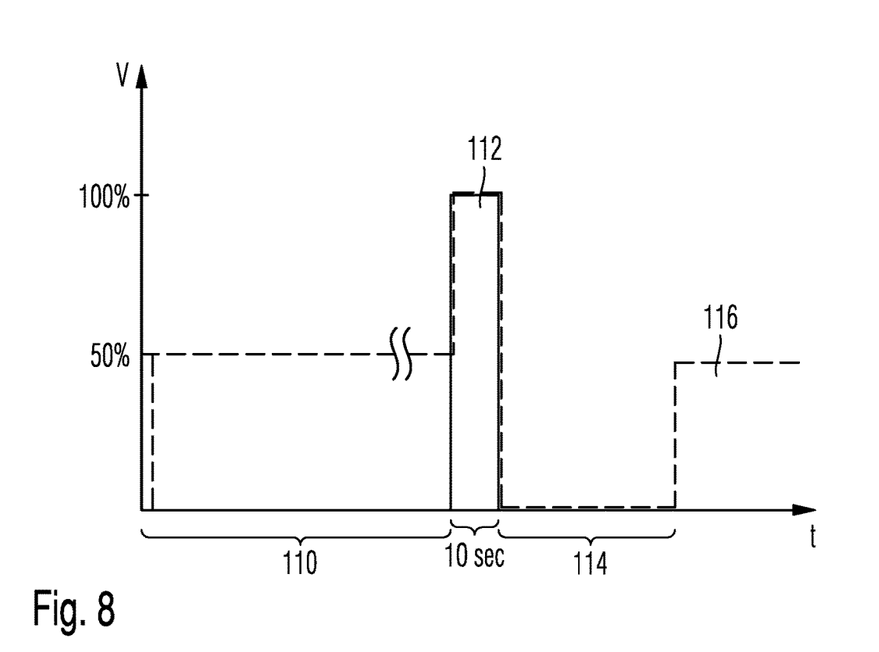
FIG. 8 a time diagram for the control in a dental milling machine in accordance with the invention.

From FIG. 8, a time diagram for an embodiment of a milling machine in accordance with the invention is visible, which is controlled by control device 96.

The aspirational air is depicted with interrupted lines, and the inlet air with solid lines. During milling step 110, vacuuming is carried out at an aspirational power of 50% of the maximum power. The milling step may last 10 min, for instance. Immediately subsequent to this, a blowing pulse 112 is output, such that air exits air amplifying nozzles 32 at high pressure and a large air volume. At the same time, or shortly after, the aspirational power is increased to 100%. This takes approximately 10 seconds. Subsequent to this, if necessary, a tool change is made in a tool-changing step 114, which, for example, takes 30 seconds to 1 minute. At this moment, both the blowing air and the aspirational air are switched off.

Subsequent to this, another milling step 116 takes place, again with the aspirational air half switched on.

It is to be understood that the exact timings, pressures and air volumes may be controlled depending on the dental restoration part to be milled, such that they may also be considerably shortened or extended.

The invention claimed is:

1. A dental milling machine comprising
a closed milling chamber which has an air inlet opening and an outlet which are substantially opposite each other relative to the milling chamber and generate an air stream which sweeps over a machining area in which a milling tool subjects a workpiece to a milling machining step,
wherein one end of the milling chamber has a first door that can be opened,
wherein a base of the milling space runs at least partially at an angle, and is rounded off, the base being closed below the machining area and having substantially constant inclination,
wherein the outlet is connected to a lowest region of the base,
wherein the outlet is attached to an outer lower corner of the milling chamber, and
wherein at least one air nozzle and/or the air inlet opening are situated at an upper corner, diametrically opposite of a suction connection.

2. The dental milling machine according to claim 1, wherein the milling chamber is essentially made out of a single-piece preform, which has a chip-repellent and/or non-adhesive surface.

3. The dental milling machine according to claim 1, wherein one side wall of the milling chamber has a movable partial wall or a second door for a passing-through of a milling workpiece and/or a milling tool.

4. The dental milling machine according to claim 1, wherein the base of the milling chamber is angled downwardly towards the outlet having an exhaust air opening and wherein the base forms a hollow fillet.

5. The dental milling machine according to claim 1, wherein at least one air nozzle comprises an air amplifying nozzle.

6. The dental milling machine according to claim 1, wherein a number of air nozzles and/or at least one deionizing electrode are arranged,
wherein the air nozzles are partially closable and the deionizing electrodes are coverable,
wherein the air nozzles are opened during wet milling and during milling of ceramic materials, and are closed during milling of plastic materials, and
wherein the deionizing electrodes are separated via blocking elements from the milling chamber otherwise during the wet milling and during the milling of ceramic materials, and are positioned within the air stream during the milling of plastic materials.

7. The dental milling machine according to claim 1, wherein at least one air nozzle comprising one air amplifying nozzle and/or a number of air nozzles arranged next to each other, are oriented towards a machining area of the milling machine, and
wherein the machining area extends, relative to a centre of the milling chamber above the centre and beyond the centre, viewed from the outlet of the milling chamber,
wherein the number of air nozzles are attached at the top of the milling chamber and at least one air nozzle which is adjacent to a wall of the milling chamber extends with an axis at an angle relative to said wall.

8. The dental milling machine according to claim 1, wherein the milling chamber is formed entirely of one piece and free of obstacles or an undercut.

9. The dental milling machine according to claim 1, wherein the outlet is flange-mounted to a deepest point of the milling chamber and extends laterally away from said milling chamber, and
wherein during wet working an outlet hose or an outlet tube extends laterally and/or downwards away from the outlet.

10. The dental milling machine according to claim 9, wherein a switching hatch or a switching valve for the outlet for switching between wet working and dry working is provided.

11. The dental milling machine according to claim 10, wherein for dry working, a suction line that may be put under a vacuum and acts on the outlet, and
wherein for wet working, the outlet drains the wastewater and/or the milling sludge in a pressure-free fashion.

12. The dental milling machine according to claim 1, wherein a switching hatch that switches milling between wet milling and dry milling by closing the switching hatch for dry milling and opening or lifting the switching hatch for wet milling.

13. The dental milling machine according to claim 1,
wherein an inclination of the base underneath the machining area and underneath the workpiece carrier and the tool, has an inclination angle of between 5 and 60 degrees, or between 15 and 25 degrees, or approximately 20 degrees.

14. The dental milling machine according to claim 1,
wherein the air stream has a current which extends along the base and is directed towards the outlet.

15. The dental milling machine according to claim 5 comprising
a control device for the air stream via which the air nozzles may be supplied with pulses of compressed air subsequently to a milling step.

16. The dental milling machine according to claim 15,
wherein the control device switches on a suction air stream during the milling step at a suction power which is reduced compared with a maximum suction air stream, and the suction air stream sucks in air through the air nozzles.

17. The dental milling machine according to claim 2,
wherein the single-piece preform is made of plastic.

18. The dental milling machine according to claim 3,
wherein the one side wall of the milling chamber is a rear wall.

19. A dental milling machine comprising
a closed milling chamber which has an air inlet opening and an outlet which are substantially opposite each other relative to the milling chamber and generate an air stream which sweeps over a machining area in which a milling tool subjects a workpiece to a milling machining step,
wherein a number of air nozzles and/or at least one deionizing electrode are arranged,
wherein one end of the milling chamber has a first door that can be opened,
wherein a base of the milling space runs at least partially at an angle, and is rounded off, the base being closed below the machining area and having substantially constant inclination,
wherein the outlet is connected to a lowest region of the base,
wherein the air nozzles are partially closable and the deionizing electrodes are coverable,
wherein the air nozzles are opened during wet milling and during milling of ceramic materials, and are closed during milling of plastic materials, and
wherein the deionizing electrodes are separated via blocking elements from the milling chamber otherwise during the wet milling and during the milling of ceramic materials, and are positioned within the air stream during the milling of plastic materials.

* * * * *